(12) United States Patent
Karito et al.

(10) Patent No.: US 8,320,020 B2
(45) Date of Patent: Nov. 27, 2012

(54) IMAGE PRINTING SYSTEM, METHOD, AND COMPUTER-READABLE MEDIUM FOR DETERMINING DOT FORMATION FOR EDGE AND FINE DRAWING COLOR PIXEL BASED ON THE RESULT OF EDGE AND FINE DRAWING DETECTION

(75) Inventors: Nobuhiro Karito, Matsumoto (JP); Masaki Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 866 days.

(21) Appl. No.: 12/465,512

(22) Filed: May 13, 2009

(65) Prior Publication Data
US 2009/0284797 A1 Nov. 19, 2009

(30) Foreign Application Priority Data
May 15, 2008 (JP) ................................. 2008-128300

(51) Int. Cl.
*G06K 15/00* (2006.01)
*G06K 9/40* (2006.01)
*B41J 2/385* (2006.01)

(52) U.S. Cl. ........ 358/3.06; 358/1.9; 358/2.1; 358/3.12; 358/3.15; 358/528; 358/534; 382/112; 382/164; 382/171; 382/251; 382/266; 347/131; 347/201; 347/254

(58) Field of Classification Search ........................ None
See application file for complete search history.

(56) References Cited

U.S. PATENT DOCUMENTS

| | | | | |
|---|---|---|---|---|
| 5,091,971 A * | 2/1992 | Ward et al. | ..................... | 382/266 |
| 6,714,676 B2 * | 3/2004 | Yamagata et al. | ............ | 382/175 |
| 7,099,520 B2 * | 8/2006 | Ishiguro | ........................ | 382/275 |
| 7,106,476 B1 * | 9/2006 | Tonami et al. | ................. | 358/1.9 |
| 7,471,421 B2 * | 12/2008 | Asai et al. | ..................... | 358/3.06 |

FOREIGN PATENT DOCUMENTS

| | | | |
|---|---|---|---|
| JP | 08-051538 | | 2/1996 |
| JP | 2004-155080 | * | 6/2004 |
| JP | 2007-118238 | | 5/2007 |
| JP | 2007-253429 | | 10/2007 |

* cited by examiner

*Primary Examiner* — Steven Kau
(74) *Attorney, Agent, or Firm* — DLA Piper LLP (US)

(57) ABSTRACT

An image printing system which determines dot forming condition when printing an image containing a plurality of pixels by using dots of a plurality of sizes includes: a fine drawing detecting unit which detects a dot color fine drawing pixel having a dot color used for printing the image and positioned on a fine drawing portion having a drawing width equal to or smaller than a predetermined value; an edge area detecting unit which detects a dot color edge area pixel having a dot color used for printing the image and positioned at a distance equal to or shorter than a predetermined value from an edge of the image; a first dot allocating unit which allocates dots such that a dot of predetermined size in the dots of the plural sizes can be formed for the dot color fine drawing pixel during printing the image; and a second dot allocating unit which allocates dots such that a dot of a size determined according to the distance from the edge of the image in the dots of the plural sizes can be formed for the dot color edge area pixel not corresponding to the dot color fine drawing pixel during printing the image.

7 Claims, 14 Drawing Sheets

IMAGE PRINTING SYSTEM, METHOD, AND COMPUTER-READABLE MEDIUM FOR DETERMINING DOT FORMATION FOR EDGE AND FINE DRAWING COLOR PIXEL BASED ON THE RESULT OF EDGE AND FINE DRAWING DETECTION

BACKGROUND

1. Technical Field

The present invention relates to a technology of image processing which determines dot forming condition at the time of printing images constituted by plural pixels using dots of plural sizes.

2. Related Art

An ink jet printer is known as a printing device which forms dots on various types of printing medium such as paper, fabric, and film for printing images. The ink jet printer prints images on the printing medium by injecting ink in colors of cyan (C), magenta (M), yellow (Y), and black (K) to the printing medium and forming ink dots on the printing medium. There is such a type of ink jet printer which can form dots of plural sizes such as large dots (L dots), medium dots (M dots), and small dots (S dots).

At the time of printing images by using the ink jet printer, a process for determining dot forming condition for respective printing pixels is generally performed based on image data corresponding to images (referred to as half tone process) (for example, see JP-A-2007-118238). Determining the dot forming condition for the respective printing pixels corresponds to determining size and color of dots to be formed for the respective printing pixels (or whether dots are formed or not).

In the half tone process, limitation is set to the total ink amount per unit area of printing medium in some cases for preventing color blurring or for other reasons. In this case, there is a possibility that a mixture of dots of different sizes are formed for printing pixels constituting edge portions of characters and drawings in an image, or that no dot is formed for a part of the printing pixels, for example. As a result, the printing image quality deteriorates due to unstableness and lack of the edges.

These problems arise not only from image printing by using this type of ink jet printer but also from other devices when determining dot forming condition for respective printing pixels in case of image printing by using dots.

SUMMARY

It is an advantage of some aspects of the invention to provide a technology which determines dot forming condition for respective printing pixels such that printing image quality can improve.

In order to solve at least a part of the problems mentioned above, the invention can be realized in the following aspects or embodiments.

An image printing system which determines dot forming condition when printing an image containing a plurality of pixels by using dots of a plurality of sizes according to a first aspect of the invention includes: a fine drawing detecting unit which detects a dot color fine drawing pixel having a dot color used for printing the image and positioned on a fine drawing portion having a drawing width equal to or smaller than a predetermined value from the plurality of pixels; an edge area detecting unit which detects a dot color edge area pixel having a dot color used for printing the image and positioned at a distance equal to or shorter than a predetermined value from an edge of the image from the plurality of the pixels; a first dot allocating unit which allocates dots such that a dot of predetermined size in the dots of the plural sizes can be formed for the dot color fine drawing pixel during printing the image; and a second dot allocating unit which allocates dots such that a dot of a size determined according to the distance from the edge of the image in the dots of the plural sizes can be formed for the dot color edge area pixel not corresponding to the dot color fine drawing pixel during printing the image.

According to this structure, the dot color edge area pixel is detected from the plural pixels constituting the image, and dots are allocated by the second dot allocating unit such that a dot of a size determined according to the distance from the edge of the image in the dots of the plural sizes can be formed for the dot color edge area pixel during printing the image. Thus, unstableness and lack of the edge can be prevented, and the printing image quality can be improved.

Moreover, the dot color fine drawing pixel positioned on the fine drawing portion (drawing width is predetermined value or smaller) is detected from the plural pixels constituting the image, and a dot of predetermined size is allocated by the first dot allocating unit instead of a dot allocated by the second dot allocating unit when a detected dot corresponds to the dot color edge area pixel and also to the dot color fine drawing pixel. Thus, dots of size peculiar to the fine drawing portion can be allocated. Accordingly, the fine drawing portion does not become extremely fine (thin) by allocation of small dot size to the fine drawing portion by the second dot allocating unit.

According to a second aspect of the invention, the image printing system of the first aspect of the invention is configured such that the first dot allocating unit determines the predetermined size based on the drawing width and the distance from the edge in direction of the drawing width.

According to this structure, dot size pattern is determined while giving priority to the direction of the drawing width of the drawing, that is, the narrow direction in the vertical and horizontal directions. Thus, the same dot size is continuously outputted in the longer direction. Accordingly, edges can be more smoothly printed.

According to a third aspect of the invention, the image printing system of the first or second aspect of the invention is configured to further include a half tone processing unit which determines dot forming condition for a pixel corresponding to neither the dot color fine drawing pixel nor the dot color edge area pixel in the plural pixels contained in the image by half tone process.

According to this structure, dot forming condition is determined by half tone process for a pixel corresponding to neither dot color fine drawing pixel nor dot color edge area pixel. Thus, limitation can be set to the total ink quantity per unit area of the printing medium for the pixel corresponding to neither of these pixels. Accordingly, prevention of blur in color and improvement of printing image quality can be achieved.

According to a fourth aspect of the invention, the image printing system of the first, second or third aspect of the invention is configured such that the image is an image consisting of white and one color of dots used for printing the image.

According to this structure, the printing image quality can improve at the time of printing images using only white and one of the dot colors used for printing the image.

According a fifth aspect of the invention, the image printing system of the first, second, third or fourth aspect of the invention is configured to include a multi-core processor which operates the respective parts.

According to this structure, the first and second dot allocating units determine sizes of dots allocated to the respective pixels independent of the process results of surrounding pixels. Thus, parallel process can be easily performed by using the multi-core processor. Accordingly, the processing speed can be considerably increased.

The invention can be practiced in various types of applications such as image processing method, dot forming condition determining method and device, dot data producing method and device, printing data producing method and device, printing method and device, computer program for providing these methods or functions of these devices, recording medium recording this computer program, and data signal containing this computer program and provided on transmission waves.

BRIEF DESCRIPTION OF THE DRAWINGS

The invention will be described with reference to the accompanying drawings, wherein like numbers reference like elements.

FIGS. 7A through 7D show examples of dot patterns produced by a first dot allocating unit 26.

FIG. 8 shows table data TD used for producing four types of dot patterns.

DESCRIPTION OF EXEMPLARY EMBODIMENT

An exemplary embodiment according to the invention is hereinafter described.

A. Overall Stucture of Embodiment

Figure 1:
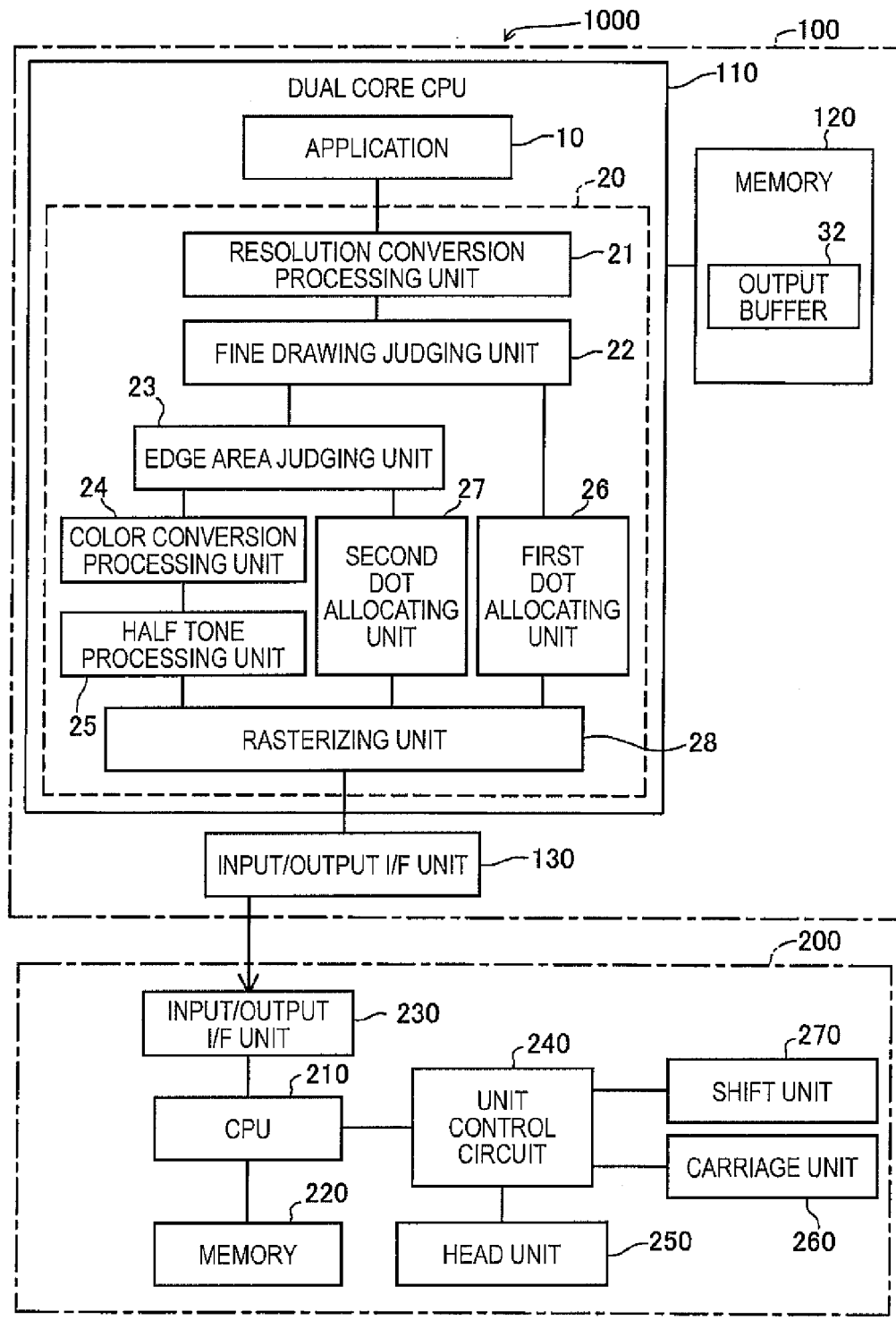
FIG. 1 illustrates a general structure of a printing system according to an embodiment of the invention.

FIG. 1 illustrates a general structure of a printing system according to an embodiment of the invention. A printing system 1000 in this embodiment has a personal computer 100 as an image processing device, and a printer 200 connected with the personal computer 100 by wire or wireless connection.

The personal computer 100 has a dual core CPU 110 for performing various processes and controls according to programs, a memory 120 for storing programs, data, and information, input/output interface (I/F) unit 130 for exchanging data and information between the personal computer 100 and an external peripheral equipment connected with the personal computer 100. The memory 120 has an output buffer 32. The personal computer 100 may further include input device such as keyboard and pointing device, display device such as display, recording and reproducing device such as CD-ROM drive device, and others.

Programs such as application program 10 and printer driver 20 are installed in the personal computer 100. The application program 10 and the printer driver 20 are performed by the dual core CPU 110 under predetermined operating system (not shown).

The application program 10 is a program for providing image editing function, for example. The user can issue a command for printing an image edited under the application program 10 through user interface provided by the application program 10. When receiving the command for printing from the user, the application program 10 outputs data of the image as printing target to the printer driver 20. In this embodiment, image data constituted by RGB data is outputted.

The printer driver 20 is a program which performs function for producing printing data based on the image data outputted from the application program 10. The printer driver 20 is stored in various types of storing medium such as CD-ROM (recording medium readable by computer or the like) for distribution, or distributed by using various types of communication unit such as the Internet.

The printer driver 20 receives the image data from the application program 10, creates printing data based on the image data, and outputs the printing data thus produced to the printer 200. In this embodiment, the printing data is data in such a form as to be interpreted by the printer 200, and contains various types of command data and dot data. The command data is data for commanding the printer 200 to perform particular operations. The dot data is data representing dot forming conditions for pixels (printing pixels) constituting an image to be printed (printing image). More specifically, the dot data shows colors and sizes of dots to be formed for the respective printing pixels (or whether dots are formed or not). The "dot" herein refers to an area of printing medium where ink injected from the printer 200 is attached and formed.

The printing driver 20 includes a resolution conversion processing unit 21, a fine drawing judging unit 22, an edge area judging unit 23, a color conversion processing unit 24, a half tone processing unit 25, a first dot allocating unit 26, a second dot allocating unit 27, and a rasterizing unit 28 to convert image data outputted from the application program 10 into printing data. The fine drawing judging unit 22 corresponds to a fine drawing detecting unit in the appended claims, and the edge area judging unit 23 corresponds to an edge area detecting unit in the appended claims.

The resolution conversion processing unit 21 performs resolution conversion process for converting the resolution of the image data outputted from the application program 10 such that the resolution of the image data agrees with the printing resolution of the printer 200.

The fine drawing judging unit 22 judges whether the respective pixels constituting the image data are black fine drawing pixels or not. The "black fine drawing pixel" herein refers to a pixel positioned on a fine drawing black pixel portion having a predetermined drawing width or smaller. In this embodiment, the predetermined width corresponds to the length of four pixels. The predetermined width may be the length of two, three, five, or other numbers of pixels instead of four pixels, and therefore may be lengths of any numbers of pixels as long as the drawing becomes a fine drawing.

The edge area judging unit 23 judges whether the respective pixels constituting the image data are black edge area pixels or not. The "edge" herein refers to a boundary between a bright portion and a dark portion produced on the image. In this specification, one pixel disposed adjacent to the edge on the dark side (i.e., distance from the edge is value 1) is referred to as "edge pixel", and one pixel disposed adjacent to the edge pixel on the dark side (i.e., distance from the edge is value 2) is referred to as "edge peripheral pixel". The edge peripheral pixel can be defined as an area having a width of two or larger numbers of pixels other than the area having the width of one pixel. The theoretical sum of the edge pixel and the edge peripheral pixel is referred to as "edge area pixel" in this specification.

Thus, the edge area judging unit 23 judges whether the respective pixels constituting the image data are either black edge pixels or black edge peripheral pixels or not. The "black edge pixel" is an edge pixel in black, and at least one pixel of four adjoining pixels disposed adjacent to the black edge pixel in the up, down, left, and right directions has color other than black in this embodiment. The "black edge peripheral pixel" is an edge peripheral pixel in black, and at least one pixel of four pixels having the distance value 2 in the up, down, left, and right directions has color other than black in this embodiment.

The color conversion processing unit 24 performs color conversion process for pixels constituting the image data and not defined as black fine drawing pixels nor positioned in the black edge area (that is, defined as not black fine drawing pixels, black edge pixels, nor black edge peripheral pixels). These pixels as targets of the color conversion processing are referred to as "ordinary process pixels". The printer 200 according to this embodiment is a printer which performs printing by using ink in colors of cyan (C), magenta (M), yellow (Y), and black (K). Thus, the color conversion processing unit 24 converts pixel values represented by RGB values into CMYK values for each of the target pixels.

The half tone processing unit 25 performs half tone processing based on the pixel values obtained by the color conversion processing by using the color conversion processing unit 24 to determine dot forming condition for printing pixels corresponding to ordinary process pixels and record the forming condition in the output buffer 32. In this embodiment, the half tone processing unit 25 executes half tone process by using threshold process based on dither matrix while setting limitation to the total ink amount per unit area of the printing medium. The printer 200 in this embodiment is a printer capable of forming three types of dots: small dots having small size (hereinafter referred to as "S dots" as well), medium dots having medium size (hereinafter referred to as "M dots" as well), and large dots having large size (hereinafter referred to as "L dots" as well). Thus, the dot forming condition for printing pixels includes four choices: forming no dots, forming S dots, forming M dots, and forming L dots.

The first dot allocating unit 26 determines dot forming condition for printing pixels corresponding to black fine drawing pixels by allocating dots of predetermined size corresponding to black fine drawing pixels contained in pixels constituting image data, and records the dot forming condition in the output buffer 32. The details of the dot allocation method will be described later.

The second dot allocating unit 27 determines dot forming condition for printing pixels corresponding to black edge pixels by allocating S dots corresponding to black edge pixels contained in pixels constituting image data, and records the dot forming condition in the output buffer 32. The second dot allocating unit 27 determines dot forming condition for printing pixels corresponding to black edge peripheral pixels by allocating M dots corresponding to black edge peripheral pixels contained in pixels constituting image data, and records the dot forming condition in the output buffer 32. In other words, the second dot allocating unit 27 allocates S dots to black pixel having distance value 1 from the black edge of the image, and allocates M dots to black pixels having distance value 2 from the black edge of the image to determined forming condition of dots.

The rasterizing unit 28 produces dot data based on the dot forming condition for respective printing pixels recorded in the output buffer 32, and disposes the dot data in the order of transfer to the printer 200.

The printer 200 in this embodiment is an ink jet printer which forms ink dots on the printing medium to print images thereon. The printer 200 includes a CPU 210 which performs overall control of the printer 200 and executes various processes according to programs, a memory 220 which stores programs, data, and information, an input/output interface (I/F) unit 230 which exchanges data and information between the printer 200 and the external personal computer 100 connected with the printer 200, a unit control circuit 240 which controls respective units in response to commands issued from the CPU 210, a head unit 250, a carriage unit 260, and a shift unit 270.

The head unit 250 has ahead (not shown) for injecting ink to the printing medium. The head has a plurality of nozzles through which ink is intermittently injected. The head is mounted on a carriage (not shown), and shifts in the main scanning direction with the shift of the carriage in the predetermined scanning direction (main scanning direction). Dot lines (raster lines) extending in the scanning direction are formed on the printing medium by intermittently injecting ink from the head moving in the main scanning direction.

The carriage unit 260 is a drive unit for reciprocatively shifting the carriage carrying the head in the main scanning direction. An ink cartridge containing ink is supported on the carriage as well as the head in such a manner as to be detachably attached to the carriage.

The shift unit 270 is a drive unit which feeds the printing medium to a position allowed for printing, and shifts the printing medium by predetermined shift amount in predetermined shift direction at the time of printing to execute sub-scanning. The shift unit 270 has a paper feed roller, a shift motor, a shift roller, a platen, a paper discharge roller (not shown), and other components.

When the user commands printing of an image on the application program 10, the application program 10 issues printing command to the printer driver 20. This printing command contains image data (RGB data) edited on the application program 10.

The resolution conversion processing unit 21 of the printer driver 20 having received the printing command converts the resolution of the image data contained in the printing command such that the resolution of the image data agrees with the printing resolution. Then, the fine drawing judging unit 22 judges whether respective pixels constituting the image data are black fine drawing pixels or not, and the edge area judging unit 23 judges whether the respective pixels constituting the image data are black edge pixels or not. The color conversion processing unit 24 and the half tone processing unit 25 perform color conversion process and half tone process for the pixels judged as normal pixels which are not black fine drawing pixels nor black edge pixels by the fine drawing judging unit 22 and the edge area judging unit 23 to determine dot forming condition.

The first dot allocating unit 26 determines dot forming condition for the pixels judged as black fine drawing pixels. The second dot allocating unit 27 determines dot forming condition for the pixels judged as black edge pixels or black peripheral pixels. The dot forming conditions thus determined are recorded on the output buffer 32. The process for determining dot forming condition will be described in detail later. The rasterizing unit 28 produces dot data based on the dot forming conditions for the respective printing pixels recorded on the output buffer 32, and disposes dot data in the order of transfer to the printer 200 to output printing data containing dot data to the printer 200 via the input/output interface unit 130.

The printer 200 having received printing data from the personal computer 100 starts printing process. The CPU 210 initially receives printing data from the personal computer 100 via the input/output interface unit 230, and analyzes the contents of various types of commands contained in the received printing data. The CPU 210 controls the shift unit 270 via the unit control circuit 240 based on the analysis result. Under this control, the shift unit 270 supplies sheet for printing (printing medium) to the inside of the printer 200 such that the sheet can reach the printing start position.

Then, the CPU 210 controls the carriage unit 260 via the unit control circuit 240. Under this control, the carriage unit 260 shifts the carriage carrying the head in the main scanning direction. The CPU 210 also controls the head unit 250 via the unit control circuit 240 based on the printing data. Under this control, the head unit 250 intermittently injects ink from the head moving in the main scanning direction based on the printing data, and forms dots on the sheet by ink drops injected and attached to the sheet. The CPU 210 further controls the shift unit 270 such that the sheet can be shifted in the shift direction relative to the head. Thus, the head can form dots at a position different from the position where dots are previously formed. The processes for forming dots and shifting sheet are repeated until data for printing is finished, and an image constituted by dots is thus formed. When all the data for printing is completed, the printing process ends.

B. Dot Forming Condition Determining Process

B-1. Entire Structure of Determining Process

Figure 2:
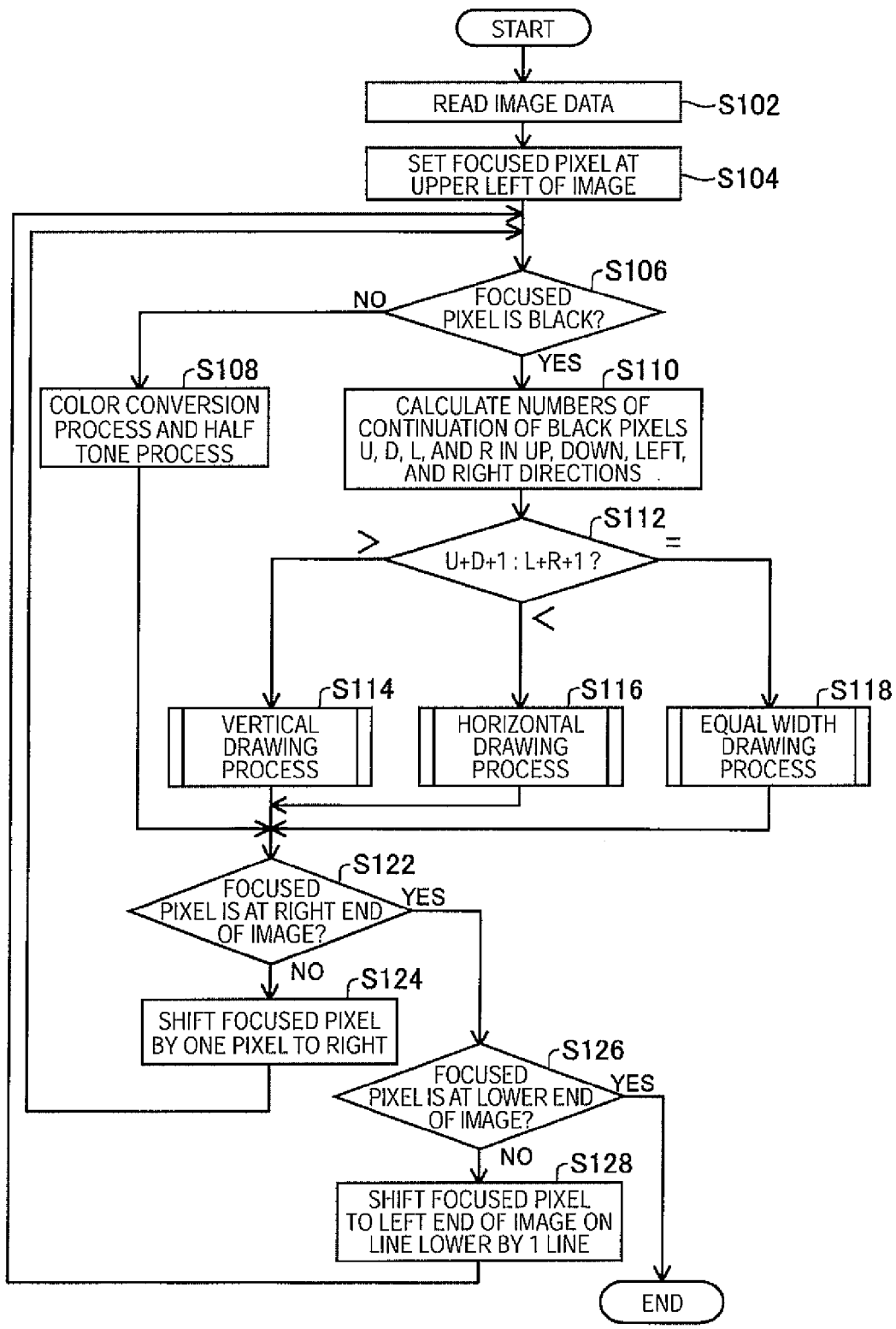
FIG. 2 is a flowchart showing flow of process for determining dot forming condition.

FIG. 2 is a flowchart showing flow of the dot forming condition determining process. The dot forming condition determining process determines dot forming condition for respective printing pixels based on image data obtained after resolution conversion process performed by the resolution conversion processing unit 21, and records the dot forming condition in the output buffer 32. The dot forming condition determining process is divided by two processor cores constituting the dual core CPU (hereinafter abbreviated as "CPU") 110 during execution of the process.

Figure 3:
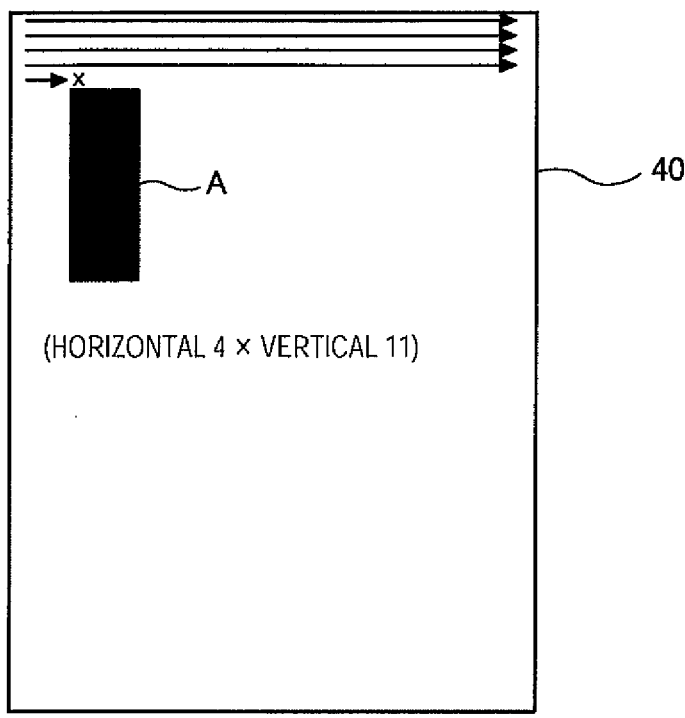
FIG. 3 illustrates an example of a printing target image produced after resolution conversion process.

FIG. 3 illustrates an example of printing target image after resolution conversion process. It is assumed herein that printing process is performed for a printing target image 40 shown in FIG. 3. The printing target image 40 shown in FIG. 3 contains a drawing A. The drawing A is constituted by horizontal 4 lines×vertical 11 rows of black pixels. Pixels in the area other than the drawing A on the printing target image 40 are all white pixels. Thus, the printing target image 40 is a monochrome image constituted only by pixels in white, and pixels in black as one of ink dot colors. A mark x in FIG. 3 indicates a focused pixel which will be described later, and a solid line with arrow indicates a track along which the focused pixel shifts.

Figure 4:
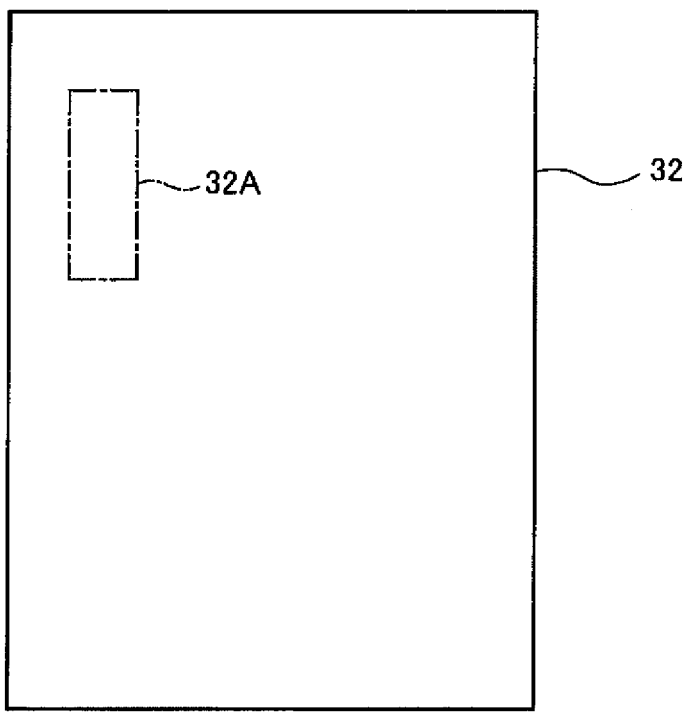
FIG. 4 illustrates a structure of an output buffer 32.

FIG. 4 illustrates the structure of the output buffer 32 (see FIG. 1). The output buffer 32 is so structured as to record dot forming condition for printing pixels corresponding to the respective pixels on the printing target image 40. A portion 32A shown in FIG. 4 corresponds to the drawing A on the printing target image 40. The output buffer 32 is not required to record dot forming condition for the printing pixels corresponding to the respective pixels on the entire printing target image 40. In performing printing process for each band (divided image as a part of band-shaped areas produced by dividing the printing target image 40), the output buffer 32 may be so structured as to record dot forming condition for printing pixels corresponding to pixels within the associated band.

After starting the process as shown in FIG. 2, the CPU 110 reads image data obtained after resolution conversion process by the resolution conversion processing unit 21 (step S102). Then, the CPU 110 sets an upper left pixel on the printing target image 40 as an initial focused pixel (step S104).

Figure 5:
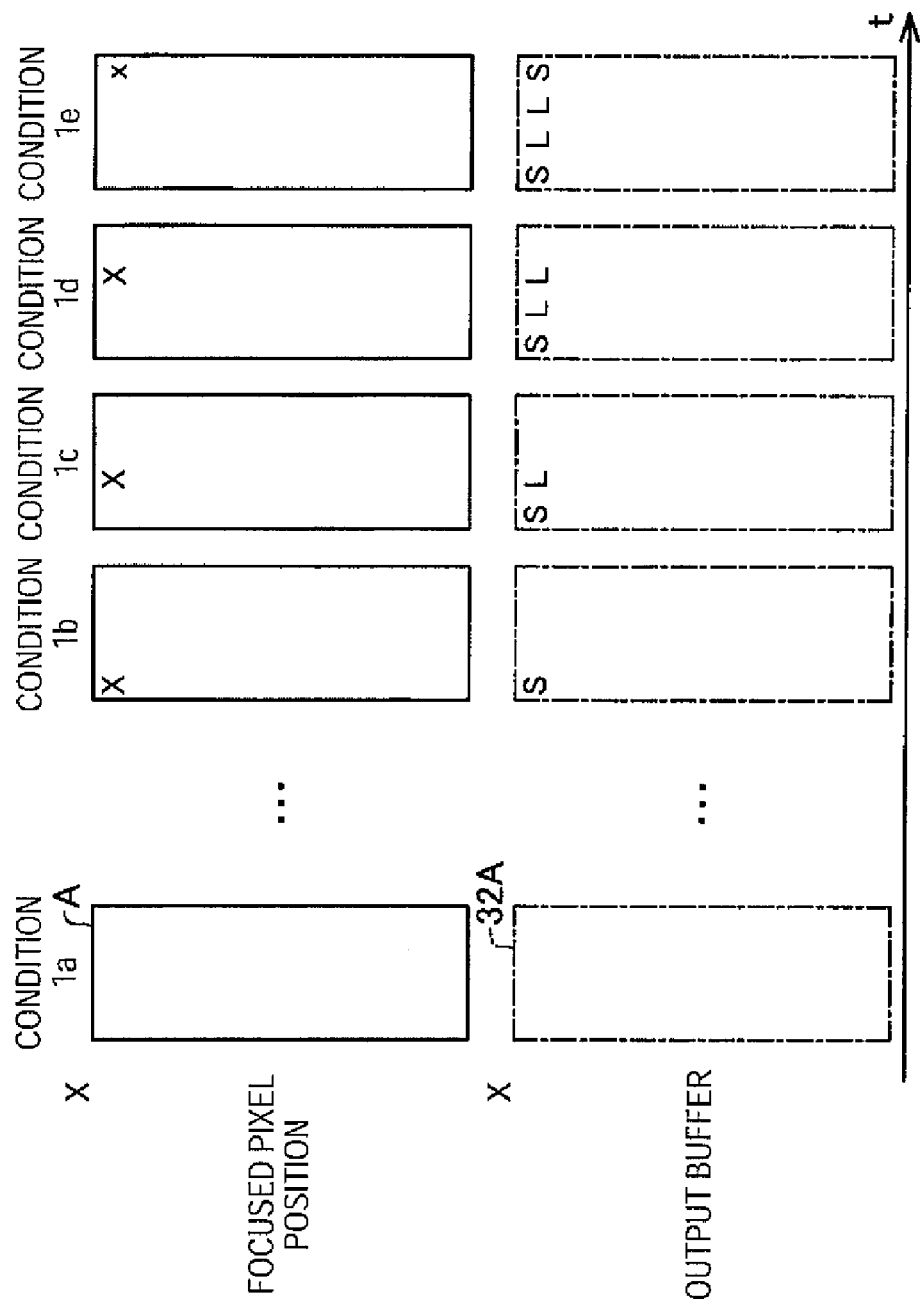
FIG. 5 shows correspondence between positions of focused pixels to which vertical drawing process is applied and conditions of the output buffer 32.
Figure 6:
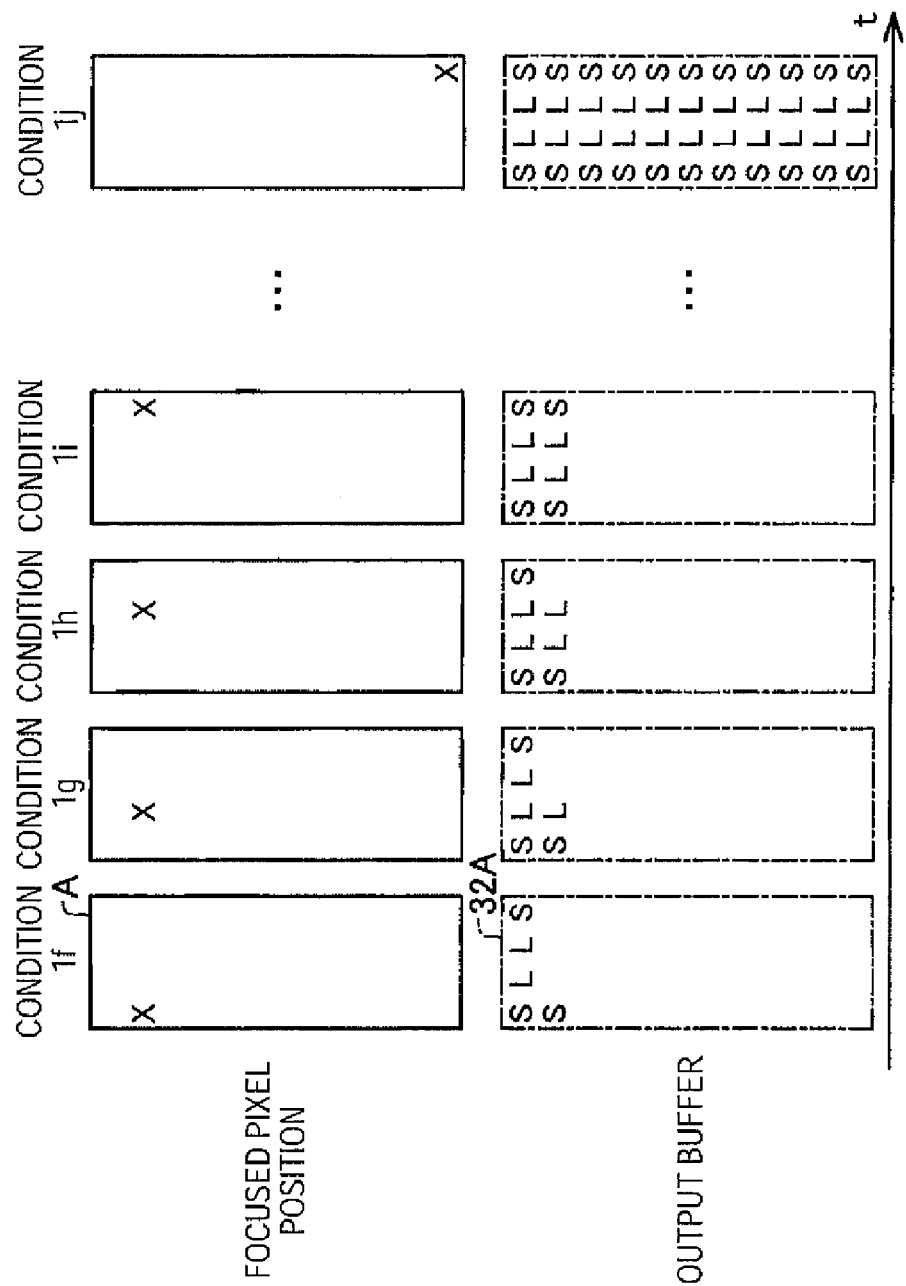
FIG. 6 shows correspondence between positions of focused pixels to which vertical drawing process is applied and conditions of the output buffer 32.

FIGS. 5 and 6 show correspondence between the positions of the focused pixel and the conditions of the output buffer 32. The positions of the focused pixel (indicated by x marks) in relation to the drawing A (see FIG. 3) on the printing target image 40 are shown on the upper parts in FIGS. 5 and 6, and the conditions of the part 32A (see FIG. 4) corresponding to the drawing A in the output buffer 32 are shown on the lower parts in the figures. Symbols "S" show dot forming condition for "forming S dots". Similarly, symbols "M" show dot forming condition for "forming M dots", and symbols "L" show dot forming condition for "forming L dots". The process goes from the left end condition (condition 1a) to the right end condition (condition 1e) in FIG. 5, and from the left end condition (condition 1f) to the right end condition (condition 1j) in FIG. 6 with elapse of time. The condition 1a in FIG. 5 indicates the condition where the upper left pixel on the printing target image 40 is set as an initial focused pixel.

Returning to FIG. 2, The CPU 110 goes to step S106 to judge whether the focused pixel is a black pixel or not after completing step S104. Since the printing target image 40 used in this embodiment is entirely white except for the portion of the drawing A, the focused pixel is not judged as black pixel in the condition a in FIG. 5. When it is judged that the focused pixel is not a black pixel (step S106: NO), the CPU 110 performs color conversion process by the color conversion processing unit 24 (FIG. 1), and also executes half tone process by the half tone processing unit 25 (step S108). After the half tone process, the dot forming condition for the printing pixel corresponding to the focused pixel in the condition a in FIG. 5 is determined as the condition for "not forming dots".

After step S108, the CPU 110 judges whether the focused pixel is the right end pixel on the printing target image 40 in step S122 (FIG. 2). When it is judged that the focused pixel is not the right end pixel on the printing target image 40 (step S122: NO), the CPU 110 shifts the focused pixel by one pixel to the right (step S124). Then, the flow returns to step S106.

When the dot forming condition for the printing pixel corresponding to the focused pixel is determined in the condition 1a in FIG. 5, the focused pixel is shifted by one pixel to the right. Then, it is again judged that the focused pixel is not a black pixel in step S106. Thus, the color conversion process by the color conversion processing unit 24 and the half tone process by the half tone processing unit 25 are also performed in this condition in step S108, and the dot forming condition for the printing pixel corresponding to the focused pixel is determined as the condition for "not forming dots". When the focused pixel shifts from the condition 1a in FIG. 5 to the right end of the printing target image 40 while repeating these processes, the focused pixel is judged as the right end pixel in step S122. At this time, the CPU 110 judges whether the focused pixel is the lower end pixel of the image or not (step S126). When it is judged that the focused pixel is not the lower end pixel (step S126: NO), the CPU 110 shifts the focused pixel to the left end of the image on the line lower by one line (step S128). Then, the flow returns to step S106.

When the focused pixel is shifted to the position corresponding to the condition 1b in FIG. 5 after repeating these processes, it is judged the focused pixel is a black pixel in step S106. Then, the CPU 110 performs steps S110 through S118 to determine the dot forming condition for the printing pixel corresponding to the focused pixel contained in the drawing as an area of collection of black pixels.

Since the processes in steps S110 through S118 contain the process performed by the first dot allocating unit 26 (see FIG. 1), the process by the first dot allocating unit 26 is now described in detail. According to this embodiment, the first dot allocating unit 26 obtains the lengths of the drawing in the vertical direction (up-down direction) and in the horizontal direction (left-right direction) to judge which length is smaller, and produces dot pattern corresponding to the distance from the edge of the focused pixel in the direction of the smaller length (hereinafter referred to as "narrow direction"). The "dot pattern" herein refers to the arrangement in dot size corresponding to each printing pixel.

Figures 7A, 7B, 7C, 7D, 8:
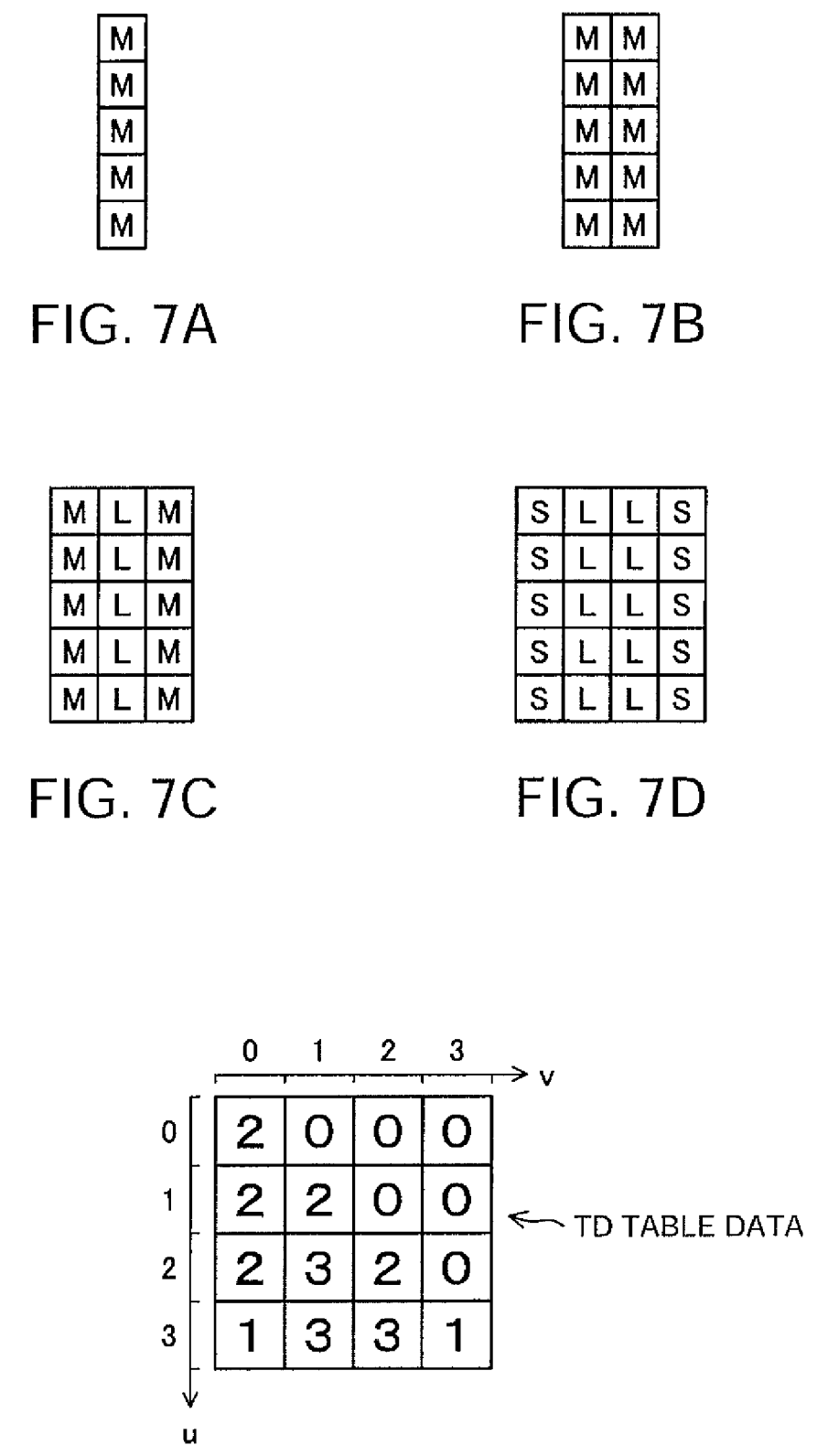

FIGS. 7A through 7D illustrate examples of dot pattern produced by the first dot allocating unit 26. The dot pattern varies according to the pixel number of the drawing in the narrow direction, i.e., the drawing width. FIG. 7A shows a dot pattern when the drawing width is 1 pixel. FIG. 7B shows a dot pattern when the drawing width is 2 pixels. FIG. 7C shows a dot pattern when the drawing width is 3 pixels. FIG. 7D shows a dot pattern when the drawing width is 4 pixels. As illustrated in FIG. 7A, the dot pattern when the drawing width is 1 pixel is "M". As illustrated in FIG. 7B, the dot pattern when the drawing width is 2 pixels is "MM". As illustrated in FIG. 7C, the dot pattern when the drawing width is 3 pixels is "MLM". As illustrated in FIG. 7D, the dot pattern when the drawing width is 4 pixels is "SLLS". Since the drawing width of the black fine drawing pixel is value 4 or lower as discussed above, four types of dot pattern are present.

FIG. 8 illustrates table data TD used for producing the four types of dot pattern. As shown in the figure, the table data TD has 4×4 matrix constituted by 0 through 3 in the vertical direction (u direction) and 0 through 3 in the horizontal direction (v direction). In the figure, "1" indicates "S dot", "2" indicates "M" dot, "3" indicates "L" dot, and "0" shows that no dot is formed.

The first dot allocating unit 26 reads data at recording positions corresponding to arguments u and v from the table data TD to obtain the dot patterns shown in FIGS. 7A through 7D. As a result, the dot pattern "M" shown in FIG. 7A is obtained when (u, v)=(0, 0). The dot pattern "MM" shown in FIG. 7B is obtained when (u, v)=(1, 0), (1, 1). The dot pattern "MLM" shown in FIG. 7C is obtained when (u, v)=(2, 0), (2, 1), (2, 2). The dot pattern "SLLS" shown in FIG. 7D is obtained when (u, v)=(3, 0), (3, 1), (3, 2), (3, 3). Each dot pattern is so determined as to have larger size as the distance from the edge increases.

Returning to FIG. 2, the processes in steps S110 through S118 are now described in detail. When the flow goes to step S110, the CPU 110 initially calculates numbers of continuation of black pixels U, D, L and R in the up, down, left, and right directions as viewed from the focused pixel (step S110). The number "U" is the number of continuation of black pixels in the upward direction as viewed from the focused pixel. The number "D" is the number of continuation of black pixels in the downward direction as viewed from the focused pixel. The number "L" is the number of continuation of black pixels in the left direction as viewed from the focused pixel. The number "R" is the number of continuation of black pixels in the right direction as viewed from the focused pixel.

In this embodiment, the drawing width for allocation of dots by the first dot allocating unit 26 is up to 4 pixels, and the drawing width for allocation of dots by the second dot allocating unit 27 is up to 2 pixels at both ends. Thus, the accurate drawing width need not be obtained when the drawing width is 5 or larger pixels, and calculation of the respective numbers of continuation of black pixels U, D, L, and R are stopped when the maximum value 4 is counted. That is, the respective numbers of continuation of black pixels U, D, L, and R become value 4 when the actual drawing width exceeds value 4.

Then, the CPU 110 compares the value of U+D+1 and the value of L+R+1, and judges which of these values is larger (including the case that the values are equal) (step S112). The value of U+D+1 indicates the number of pixels in the vertical direction of the drawing including the focused pixel, and the value of L+R+1 indicates the number of pixels in the horizontal direction of the drawing including the focused pixel. In the process of step S112, therefore, it is judged which of vertical drawing containing a smaller number of pixels in the horizontal direction than the number of pixels in the vertical direction, horizontal drawing containing a smaller number of pixels in the vertical direction than the number of pixels in the horizontal direction, and equal width drawing containing the same number of pixels in the vertical and horizontal directions corresponds to the drawing containing the focused image.

When ">" in step S112, that is, when it is determined that the drawing containing the focused pixel is a vertical drawing, dot forming process corresponding to vertical drawing, i.e., vertical drawing process is performed (step S114). When "<" in step S112, that is, when it is determined that the drawing containing the focused pixel is a horizontal drawing, dot forming process corresponding to horizontal drawing, i.e., horizontal drawing process is performed (step S116). When "=" in step S112, that is, when it is determined that the drawing containing the focused pixel is an equal width drawing, dot forming process corresponding to equal width drawing, i.e., equal width drawing process is performed (step S118).

When the focused pixel is located at the position of the condition 1b in FIG. 5 where U=0, D=4, L=0, and R=3, the flow goes to step S114 and performs the vertical drawing process.

B-2. Structure of Vertical Drawing Process

Figure 9:
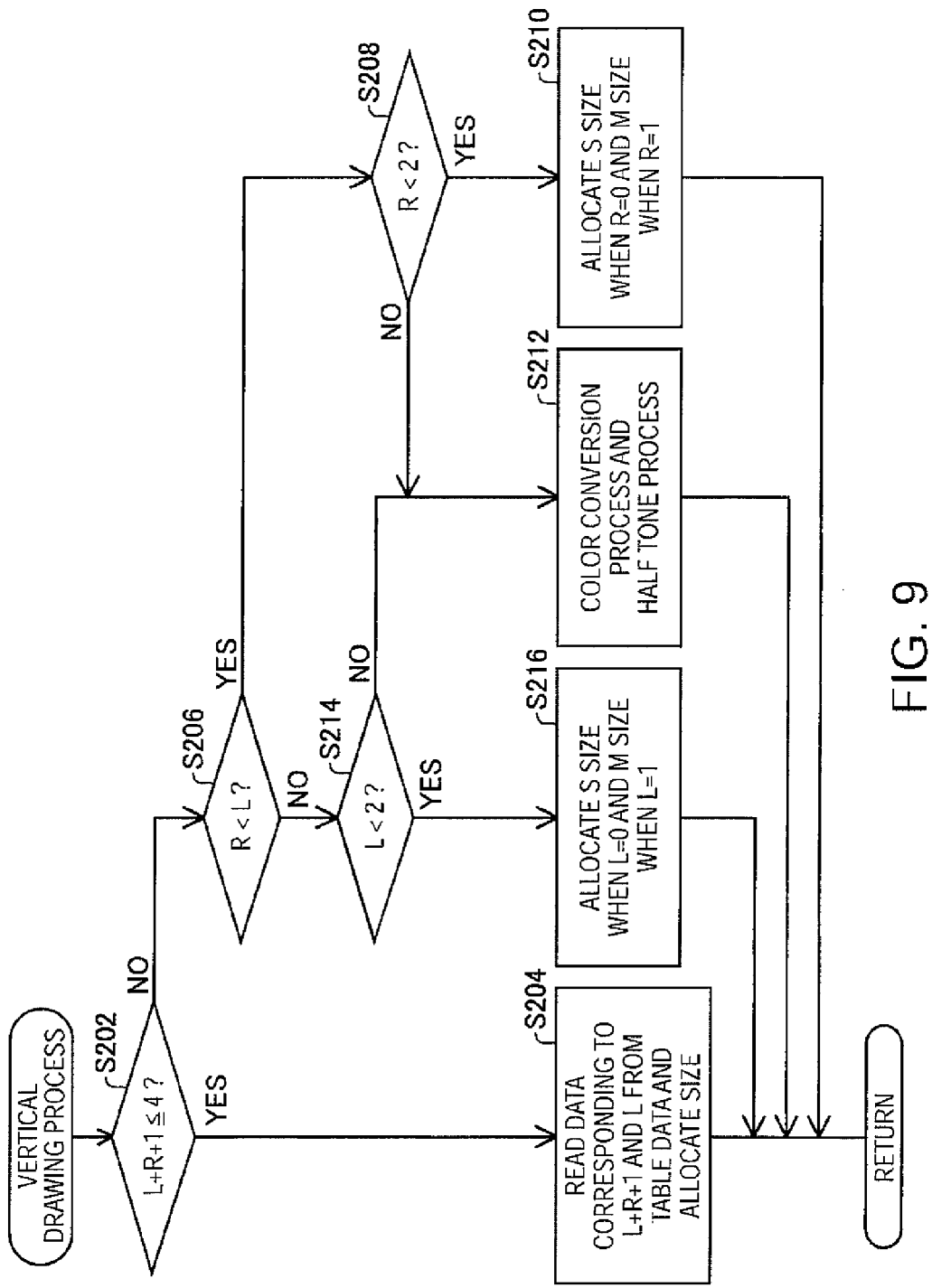
FIG. 9 is a flowchart showing vertical drawing process performed in step S114.

FIG. 9 is a flowchart showing the vertical drawing process performed in step S114. The CPU 110 initially judges whether the value of L+R+1, i.e., the number of pixels in the horizontal direction of the drawing is 4 or smaller or not. This process judges whether the focused pixel corresponds to a black fine drawing pixel, and is performed by the fine drawing judging unit 22 (FIG. 1). When it is judged that L+R+1≦4 in step S202, the CPU 110 determines that the focused pixel corresponds to a black fine drawing pixel. Thus, the CPU 110 reads data at the recording position corresponding to (u, v)= (L+R+1, L) from the table data TD (FIG. 8) and allocates dots of the size corresponding to the data by using the first dot allocating unit 26 (step S204). More specifically, the CPU 110 sets the number of pixels in the narrow direction (horizontal direction) at argument u, and the pixel position in the narrow direction (distance from edge on one side) at argument v, reads data at the recording position corresponding to the arguments u, and v from the table data TD, and allocates dots of the size corresponding to the data. When the focused pixel is located at the position of the condition 1b in FIG. 5 where L+R+1=4 and L=0, value 1 is read from the table data TD to allocate dots of S size.

Then, the focused pixel is shifted by one pixel from the condition 1b to the right and reaches the condition 1c in FIG. 5, and the process for calculating the number of continuation of black pixels U, D, L, and R is performed for this focused pixel in step S110 (FIG. 2). As a result, the relation U+D+ 1>L+R+1 is obtained based on the calculated U=0, L=1, R=2, and D=4, and thus the vertical drawing process is executed for this focused pixel. The equation L+R+1=4 holds in the vertical drawing process (FIG. 9), and thus the flow goes to step S204. Since L+R+1=4, and L=1, value 3 is read from the table data TD to allocate dots of L size.

Then, the focused pixel is shifted by one pixel from the condition 1c in FIG. 5 to the right and reaches the condition 1d in FIG. 5, and the process for calculating the number of continuation of black pixels U, D, L, and R is performed for this focused pixel in step S110 (FIG. 2). As a result, the relation U+D+1>L+R+1 is obtained based on the calculated U=0, L=2, R=1, and D=4, and thus the vertical drawing process is executed for this focused pixel. The equation L+R+ 1=4 holds in the vertical drawing process (FIG. 9), and thus the flow goes to step S204. Since L+R+1=4, and L=2, value 3 is read from the table data TD to allocate dots of L size.

Similarly, when the focused pixel is shifted to the right to the condition 1e in FIG. 5, the vertical drawing process is similarly performed. Since the equation L+R+1=4 holds in the vertical drawing process (FIG. 9), the flow goes to step S204. Based on L+R+1=4, L=3, value 1 is read from the table data TD to allocate dots of S size.

The condition 1f in FIG. 6 shows a condition where the focused pixel is shifted below by 1 line. The process for calculating the number of continuation of black pixels U, D, L, and R is performed for this focused pixel in step S110 (FIG. 2). As a result, the relation U+D+1>L+R+1 is obtained based on the calculated U=1, L=0, R=3, and D=4, the vertical drawing process is executed for this focused pixel. The equation L+R+1=4 holds in the vertical drawing process (FIG. 9), and thus the flow goes to step S204. Based on L+R+1=4, and L=0, value 1 is read from the table data TD to allocate dots of S size.

Similarly, L=1, L=2, and L=3 are obtained for the focused pixels in the condition 1g, the condition 1h, and the condition i (FIG. 5), respectively. Thus, dots of L size, L size, and S size are allocated to the focused pixels in the condition 1g, the condition 1h, and the condition i, respectively. Similar processes are performed for the remaining pixels to allocate dots for the focused pixel in the condition j. Thus, the dot forming conditions for the entire pixels contained in the drawing A are determined.

Returning to FIG. 9 where it is judged that the number of pixels in the horizontal direction of the drawing exceeds value 4 in step S202, the CPU 110 determines that the focused pixel is not a black fine drawing pixel and performs the steps S206 through S216. More specifically, the CPU 110 initially judges whether R is smaller than L or not (step S206), and further judges whether R is smaller than value 2 when having determined that R is smaller than L (step S208). In case that R is determined as smaller than L and that R is determined as smaller than value 2, the CPU 110 allocates S size dots when the focused pixel corresponds to black edge pixel (when R=0) and allocates M size dots when the focused pixel corresponds to black edge peripheral pixel (when R=1) (step S210). The processes in steps S208 and S210 are performed by the second dot allocating unit 27. When it is determined that R is 2 or larger than value 2 in step S208, color conversion process and half tone process similar to those in step S108 (FIG. 2) are performed (step S212).

When it is judged that R is L or larger in step S206, the CPU 110 judges whether L is smaller than value 2 (step S214). In case that L is determined as smaller than value 2, the CPU 110 allocates S size dots when the focused pixel corresponds to black edge pixel (when L=0), and allocates M size dots when the focused pixel corresponds to black edge peripheral pixel (when L=1) (step S216). When it is determined that L is 2 or larger than value 2 in step S214, the flow goes to step S212 to perform color conversion process and half tone process similar to those in step S108 (FIG. 2). That is, in steps S210 and S216, dot pattern corresponding to the distance from the edge of the focused pixel in the narrow direction (drawing width direction) is produced. After executing step S204, step S210, step S212, or step S216, the flow goes to "RETURN" and temporarily ends the vertical drawing process.

B-3. Structure of Horizontal Drawing Process

Figure 10:
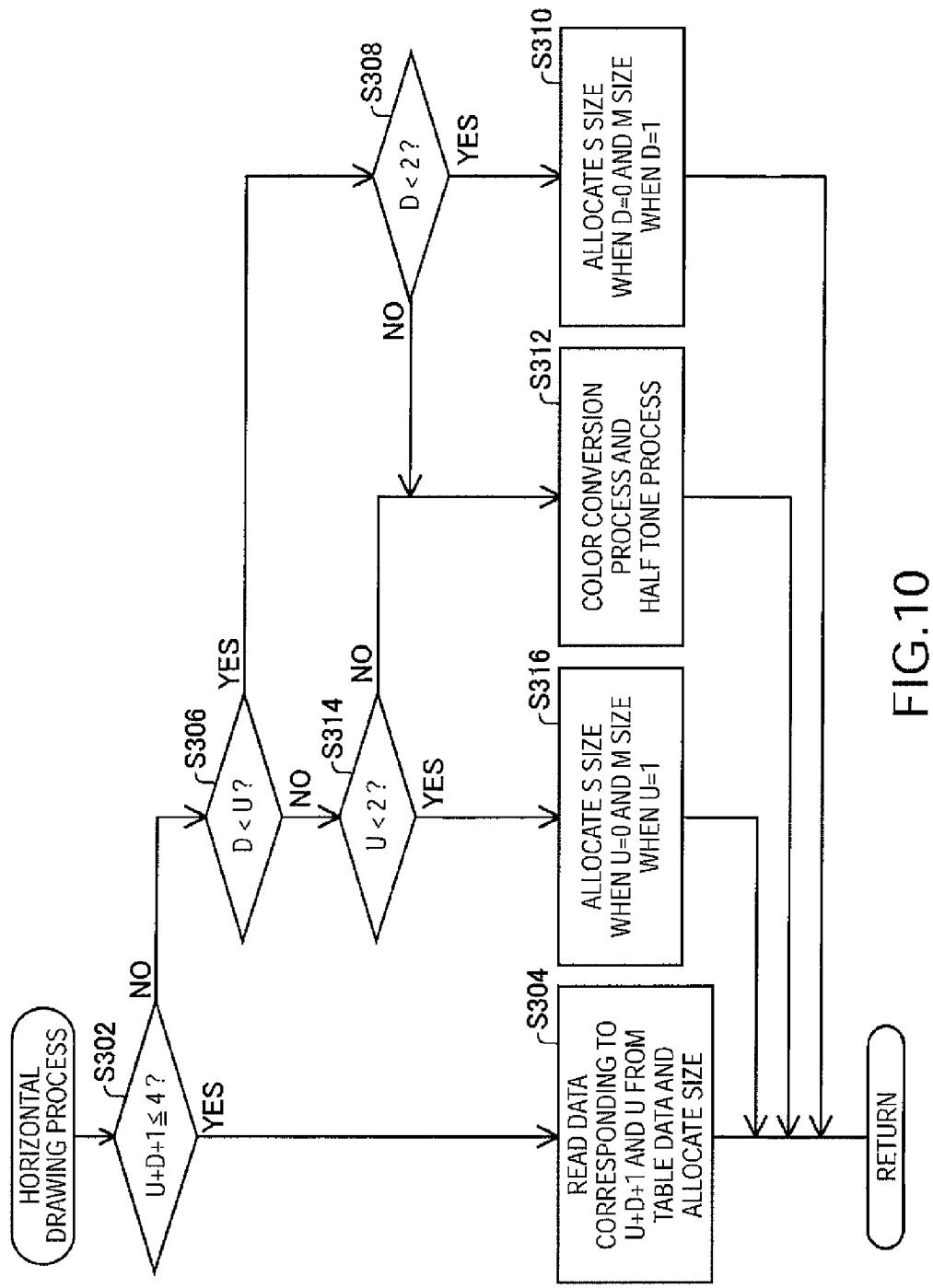
FIG. 10 is a flowchart showing horizontal drawing process performed by step S116.

FIG. 10 is a flowchart showing the horizontal drawing process performed in step S116. The horizontal drawing process is produced based on the same principle as that of the vertical drawing process described with reference to FIG. 9. More specifically, while dot pattern corresponding to the distance from the edge of the focused pixel in the left-right direction (L-R direction) as the narrow direction is produced in the vertical drawing process, dot pattern corresponding to the distance from the edge of the focused pixel in the up-down direction (U-D direction) as the narrow direction is produced in the horizontal drawing process. Thus, as shown in the figure, "L" in the vertical drawing process in FIG. 9 is converted into "U" in the horizontal drawing process, and "R" in the vertical drawing process is converted into "D" in the horizontal drawing process. The step numbers are numbers between 200 and 399, and have the same lower two digit numbers as those in the vertical drawing process.

Figure 11:
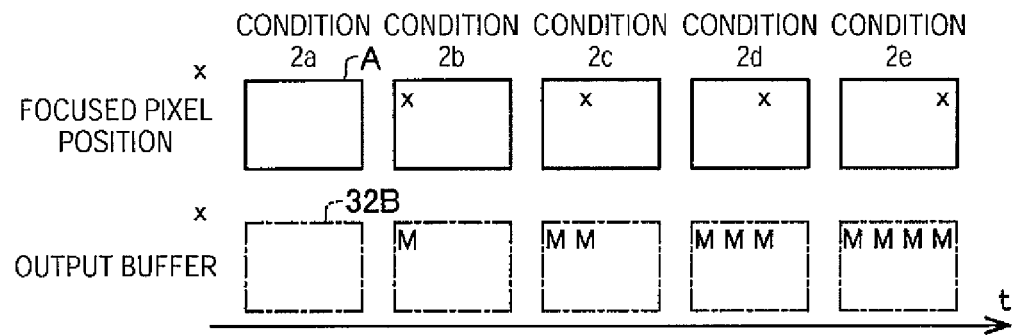
FIG. 11 shows correspondence between positions of focused pixels to which horizontal drawing process is applied and conditions of the output buffer 32.
Figure 12:
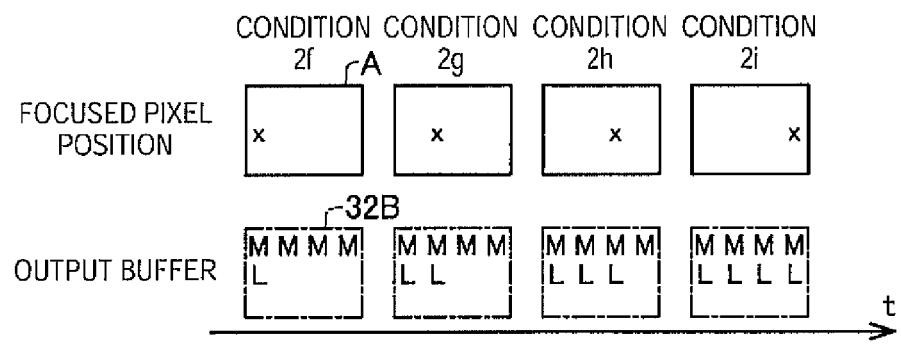
FIG. 12 shows correspondence between positions of focused pixels to which horizontal drawing process is applied and conditions of the output buffer 32.
Figure 13:
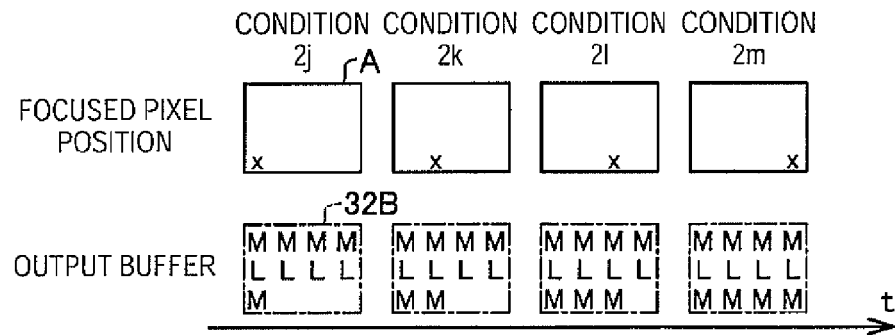
FIG. 13 shows correspondence between positions of focused pixels to which horizontal drawing process is applied and conditions of the output buffer 32.

FIGS. 11 through 13 show correspondences between the positions of the focused pixel for which the horizontal drawing process is performed and the conditions of the output buffer 32. The upper parts in FIGS. 11 through 13 show the positions of the focused pixel (indicated by x marks) in relation to drawing B, and the lower parts show conditions of a part 32B of the output buffer 32 corresponding to the drawing B. The drawing B has black pixels of 4 horizontal lines×3 vertical rows which performs the horizontal drawing process. The process shifts from the left end condition (condition 2a) to the right end condition (condition 2e) in FIG. 11, and further from the left end condition (condition 2f) to the right end condition (condition 2i) in FIG. 12, and still further from the left end condition (condition 2j) to the right end condition (condition 2m) in FIG. 13 with elapse of time.

The detailed explanation of the respective steps of the horizontal drawing process shown in FIG. 10 and the detailed explanation of the shift from the condition 2a to the condition 2m illustrated in FIGS. 11 through 13 are not shown herein. In brief, dot pattern corresponding to the distance from the edge of the focused pixel in the vertical direction as the narrow direction is produced when the drawing is a horizontal drawing whose number of pixels in the vertical direction is value 4 or smaller. More specifically, dot pattern corresponding to the distance from the edge of the focused pixel in the vertical direction is produced by reading data from the table data TD shown in FIG. 8 setting the argument u at U+D+1 and the argument v at U. As a result, M size dots are allocated to the respective printing pixels on the upper lines, S size dots are allocated to the respective printing pixels on the middle lines in the up-down direction, and M size dots are allocated to the respective printing pixels on the lower lines for the horizontal drawing whose pixel number in the vertical direction is 3 as shown in the condition 2m in FIG. 13.

B-4. Structure of Equal Width Drawing Process

Figure 14:
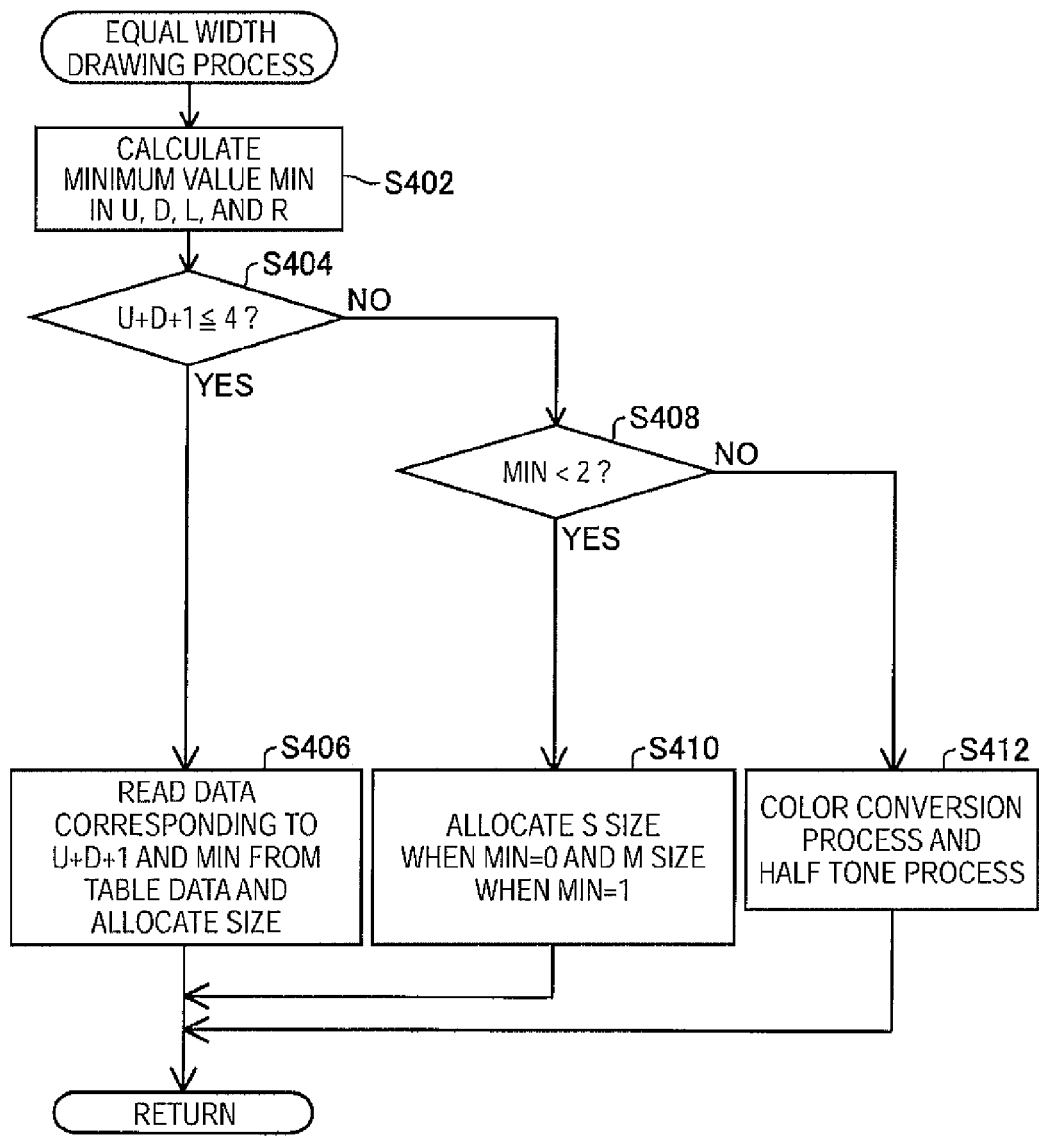
FIG. 14 is a flowchart showing equal width drawing process performed in step S116.

FIG. 14 is a flowchart showing the equal width drawing process performed in step S116. When the flow goes to the equal width drawing process, the CPU 110 initially selects the minimum value from the numbers of continuation of the black pixels U, D, L, and R calculated in step S110 to obtain minimum distance MIN from the edge of the focused pixel (step S402).

Then, the CPU 110 judges whether the value of U+D+1, i.e., the number of pixels of the horizontal width of the drawing is value 4 or smaller or not (step S404). This process judges whether the focused pixel corresponds to a black fine drawing pixel, and is performed by the fine drawing judging unit 22 (FIG. 1). When determined as U+D+1≦4 in step S404, the CPU 110 judges that the focused pixel corresponds to a black fine drawing pixel, and reads data of the recording position corresponding to (u, v)=(U+D+1, MIN) from the table data TD (FIG. 8) to allocate dots of the size corresponding to the data by using the first dot allocating unit 26 (step S406). That is, the CPU 110 reads data from the table data TD setting the argument v at the minimum distance MIN.

When it is determined that the focused pixel does not correspond to a black fine drawing pixel in step S404, the CPU 110 judges whether the minimum distance MIN is smaller than value 2 (step S408). In case that the minimum distance MIN is smaller than value 2 by the judgment, the CPU 110 allocates S size dots when the focused pixel corresponds to a black edge pixel (when MIN=0), and allocates M size dots when the focused pixel corresponds to a black edge peripheral pixel (when MIN=1) (step S410). The process in step S410 is performed by the second dot allocating unit 27. When it is determined that MIN is value 2 or larger in step S408, color conversion process and half tone process similar to those in step S108 (FIG. 2) are performed (step S412).

After executing step S406, S410 or step S412, the flow goes to "RETURN" to temporarily end the equal width drawing process.

Figure 15:
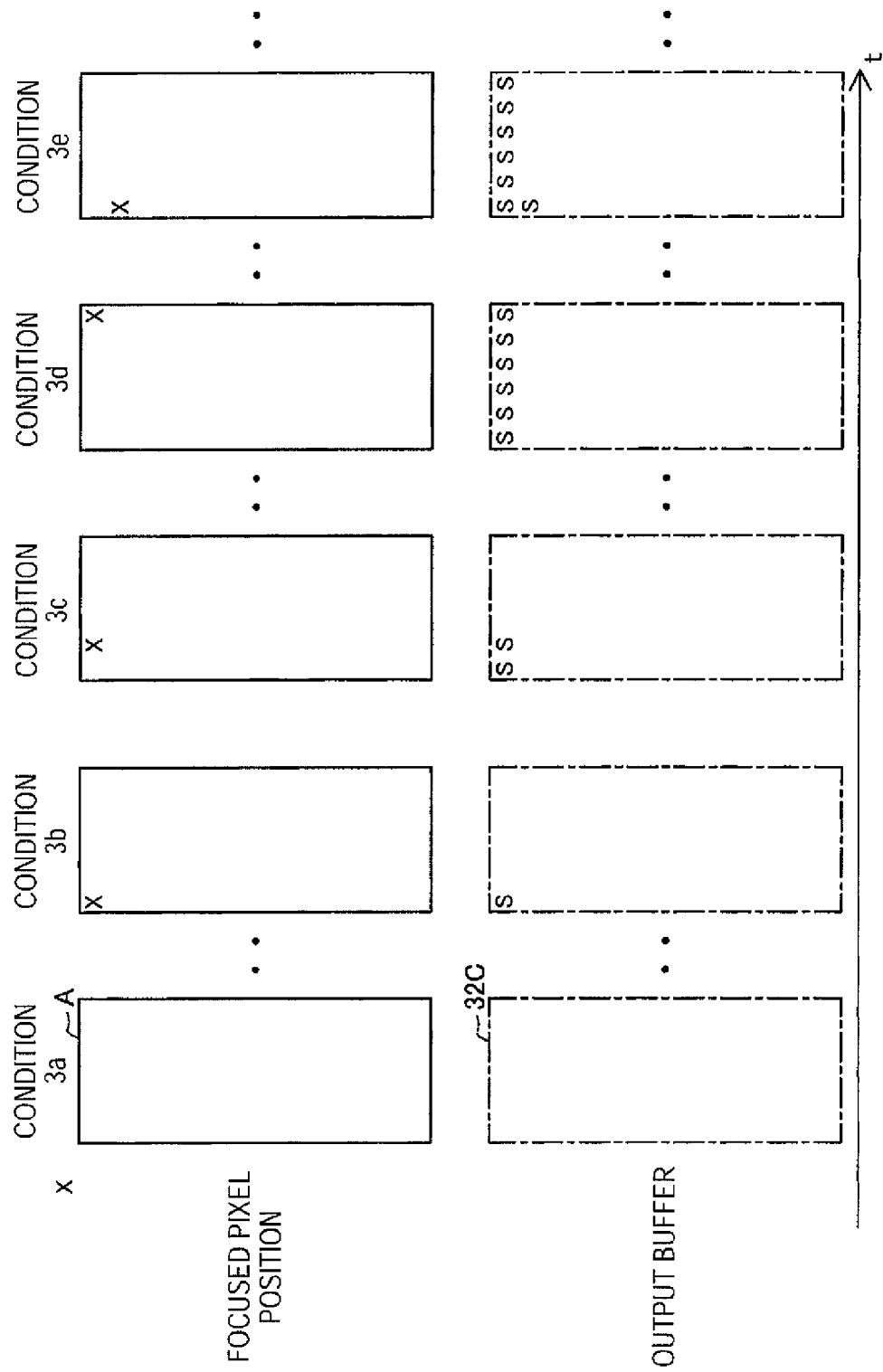
FIG. 15 shows correspondence between positions of focused pixels to which equal width drawing process is applied and conditions of the output buffer 32.
Figure 16:
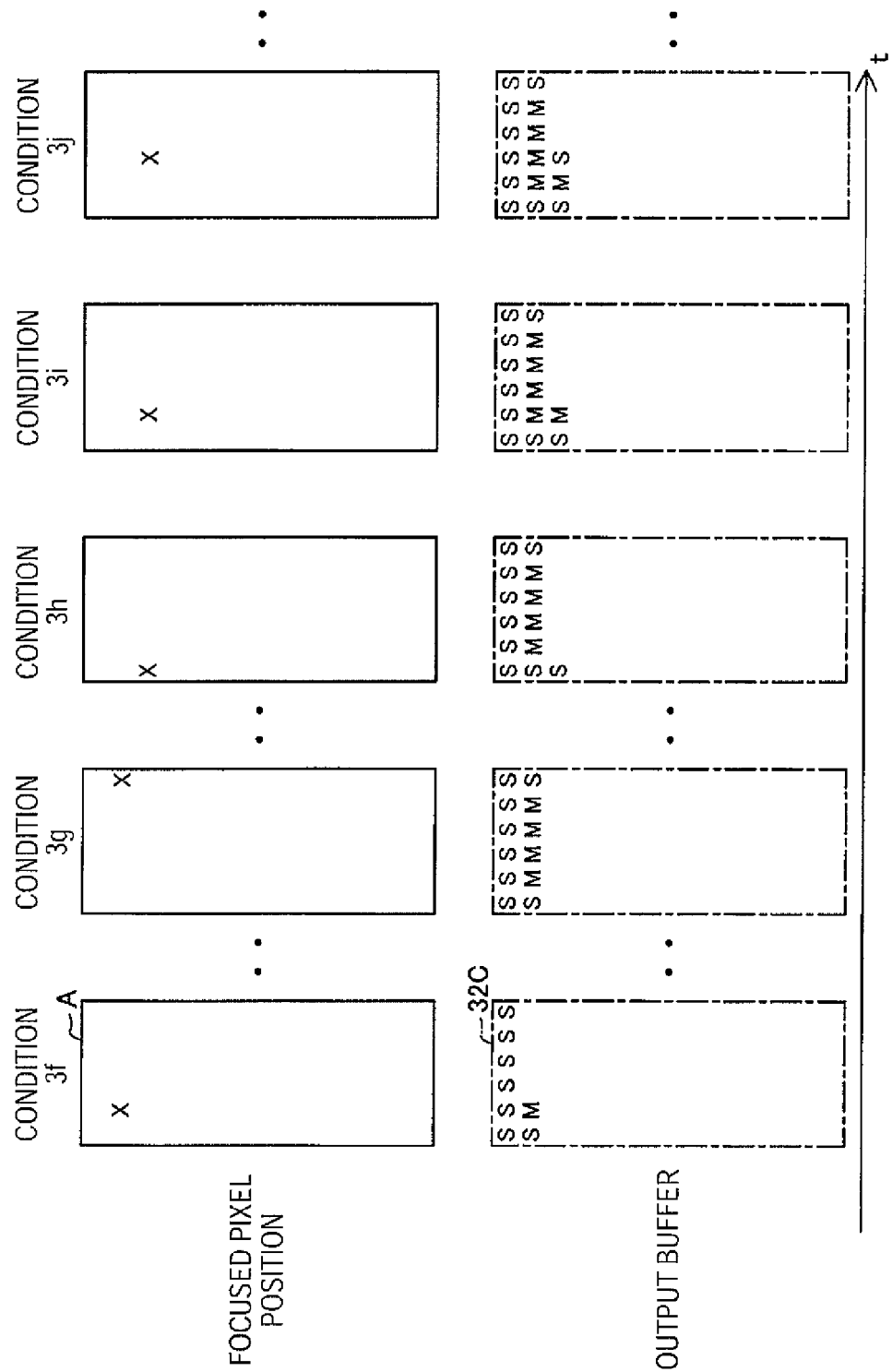
FIG. 16 shows correspondence between positions of focused pixels to which equal width drawing process is applied and conditions of the output buffer 32.
Figure 17:
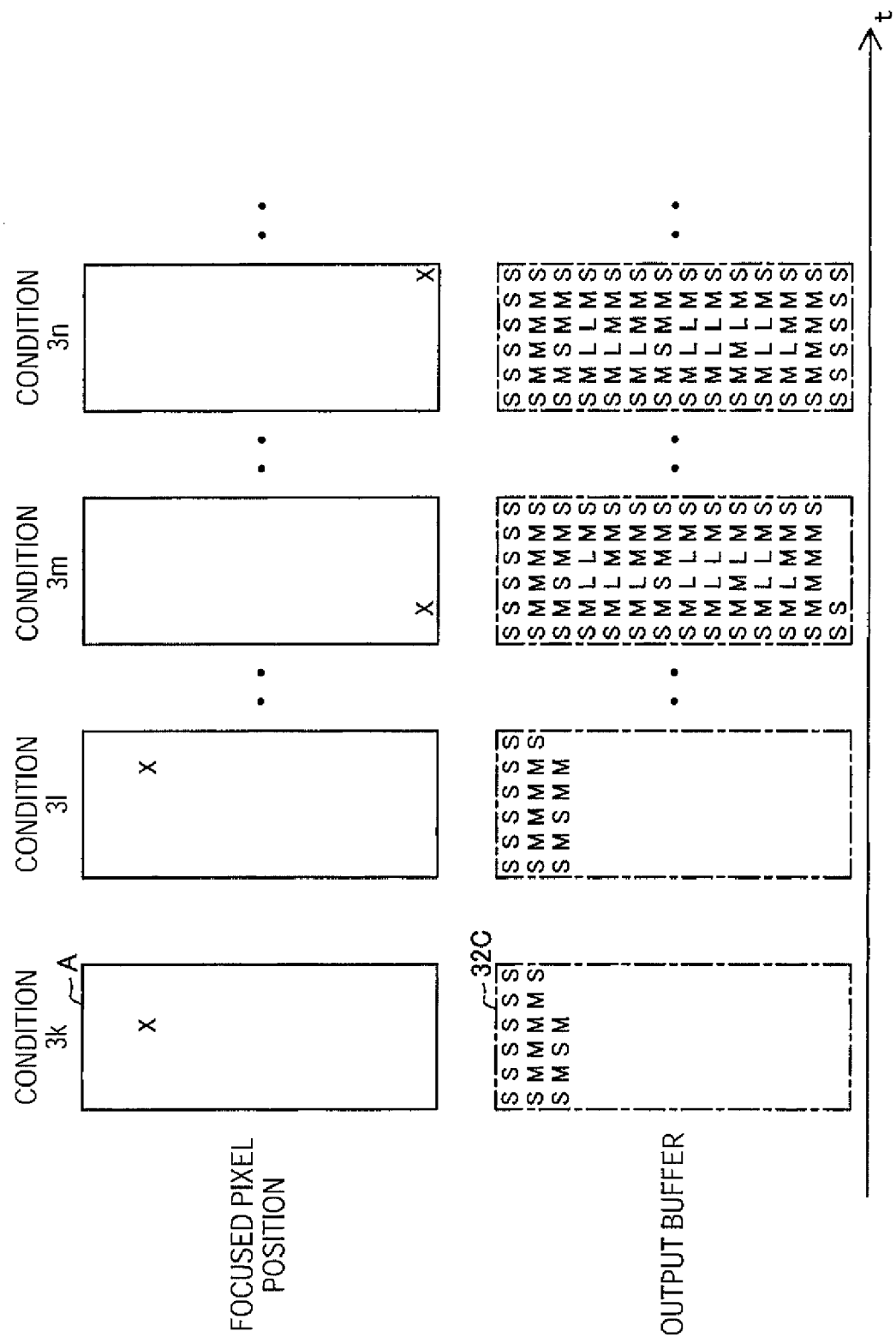
FIG. 17 shows correspondence between positions of focused pixels to which equal width drawing process is applied and conditions of the output buffer 32.

FIGS. 15 through 17 show correspondences between the positions of the focused pixel for which the equal width drawing process is performed and the conditions of the output buffer 32. The upper parts in FIGS. 15 through 17 show the positions of the focused pixel (indicated by x marks) in relation to drawing C, and the lower parts show conditions of a part 32C of the output buffer 32 corresponding to the drawing C. The drawing C has black pixels having 6 horizontal lines×14 vertical rows which performs the equal width drawing process. The process shifts from the left end condition (condition 3a) to the right end condition (condition 3e) in FIG. 15, and further from the left end condition (condition 3f) to the right end condition (condition 3j) in FIG. 1, and still further from the left end condition (condition 3k) to the right end condition (condition 3n) in FIG. 17 with elapse of time.

When the focused pixel is shifted to the condition 3b in FIG. 15 where U=0 and L=0 due to absence of black pixel on the upper part and left part, and 5 pixels and 13 pixels exist on the right part and the lower part, respectively. In this case, the maximum value is 4, and the process for calculating R and D is stopped in the middle of the process, providing R=4, and D=4. Since it is determined that the value of U+D+1 is equal to the value of L+R+1 in step S112 in FIG. 2, the flow goes to the equal width drawing process in step S118. Actually, the drawing widths in this case are not equal. However, when the widths in the vertical and horizontal directions are sufficiently large, unstableness can be reduced by outputting two pixels at both ends having dot size corresponding to the distance from the edge. Since this process for the end portions is performed in step S410 of the equal width drawing process, no problem occurs when the equal width drawing process is applied.

According to the equal width drawing process shown in FIG. 14, it is judged that U+D+1=5>4 in step S404, and that the minimum distance MIN=0<2 in step S408, and thus the flow goes to step S412. Based on MIN=0 in step S412, S size is recorded (condition 3b in FIG. 15).

When the focused pixel is shifted by one pixel from the condition 3b in FIG. 15 to the right and reaches the condition 3c in FIG. 15, U=0, L=1, R=4, and D=4 are obtained. In this case, the value U+D+1 is not equal to the value L+R+1 but the relation U+D+1<L+R+1 holds. Thus, the horizontal drawing process is performed for this pixel. Actually, the drawing is a vertical drawing having smaller horizontal width. However, both the vertical and horizontal widths are sufficiently large, and only process for end portions is performed. Thus, no problem occurs when the drawing is judged as horizontal drawing. According to the horizontal drawing process shown in FIG. 10, it is initially judged that U+D+1=5>4 in step S302, that D=4>U=0 in step S306, and that U=0<2 in step S314, thus the flow goes to step S316. Based on U=0 in step S316, S size is recorded (condition 3c in FIG. 15).

The focused pixel sequentially shifts to the right, and the horizontal drawing process is performed for the remaining pixels on the first line except for the rightmost pixel. As a result, U=0 is obtained, and S size is recorded in step S316. For the rightmost pixel in the condition 3d, U=0, L=4, R=0, and D=4 are obtained, and thus the equal width drawing process is performed. According to the equal width drawing process shown in FIG. 14, it is judged that U+D+1=5>4 in step S404, and that the minimum distance MIN=0<2 in step S408, and thus the flow goes to step S412. Based on MIN=0 in step S412, S size is recorded (condition 3d in FIG. 15).

When the focused pixel is shifted below by one line to the condition 3e shown in FIG. 15, U=1, L=0, R=4, and D=4 are obtained. Thus, the value U+D+1=6 becomes larger than the value L+R+1=5, and the vertical drawing process is performed for this pixel. According to the vertical drawing process shown in FIG. 9, it is judged that L+R+1=5>4 in step S202, that R=4>L=0 in step S206, and that L=0<2 in step S214, and thus the flow goes to step S216. Based on L=0 in step S216, S size is recorded (condition 3e in FIG. 15).

When the focused pixel is shifted by one pixel from the condition 3e in FIG. 15 to the right and reaches the condition 3f in FIG. 16, U=1, L=1, R=4, and D=4 are obtained. Thus, the value of U+D+1 becomes equal to the value of L+R+1, and the equal width drawing process is performed. According to the equal width drawing process shown in FIG. 14, it is judged that U+D+1=6>4 in step S404, and that the minimum distance MIN=1<2 in step S408, and thus the flow goes to step S412. Based on MIN=1 in step S412, M size is recorded (condition 3f in FIG. 16).

The focused pixel is sequentially shifted from the condition 3f in FIG. 16 to the right, and the horizontal drawing process is performed for the remaining pixels on the second line except for the rightmost pixel. As a result, MIN=1 is obtained, and M size is recorded in step S412. Then, any of the equal width drawing process, the vertical drawing process, and the horizontal drawing process is sequentially performed for the rightmost pixel in the condition 3g on the second line, the leftmost pixel in the condition 3h on the third line, and the second pixel in the condition 3i from the leftmost pixel on the third line. As a result, dots of the size corresponding to the minimum distance from the edge are recorded in the output buffer 32.

When the focused pixel is shifted to the position in the condition 3j in FIG. 16, U=2, L=2, R=3, and D=4 are obtained. In this case, U+D+1>L+R+1 holds, and thus the vertical drawing process is performed for the focused pixel. According to the vertical drawing process (FIG. 9) where L+R+1=6, the flow goes to step S206. Based on R=3>L=2, the flow goes to step S214. Based on that L is 2 and not smaller than 2, the flow goes to step S212. In step S212, color conversion process and half tone process are performed for the focused pixel, and S size dots determined by the half tone process are recorded in the output buffer 32 (condition 3j in FIG. 16).

When the focused pixel is shifted by one pixel from the condition 3j in FIG. 16 to the right and reaches the condition 3k in FIG. 17, U=2, L=3, R=2, and D=4 are obtained. In this case, U+D+1>L+R+1 holds, and thus the vertical drawing process is performed for the focused pixel. According to the vertical drawing process (FIG. 9) where L+R+1=6, the flow goes to step S206. Based on R=2<L=3, the flow goes to step S208. Based on that R is 2 and not smaller than 2, the flow goes to step S212. In step S212, color conversion process and half tone process are performed for the focused pixel, and M size dots determined by the half tone process are recorded in the output buffer 32 (condition 3k in FIG. 17).

Thereafter, shift of the focused pixel and determination of dot forming condition by the method according to the judgment result of the focused pixel are repeated, and the condition of the output buffer 32 is shifted as shown in the condition 3l, the condition 3m, and the condition 3n in FIG. 17.

C. Advantage of Embodiment

Figures 18A, 18B, 18C:
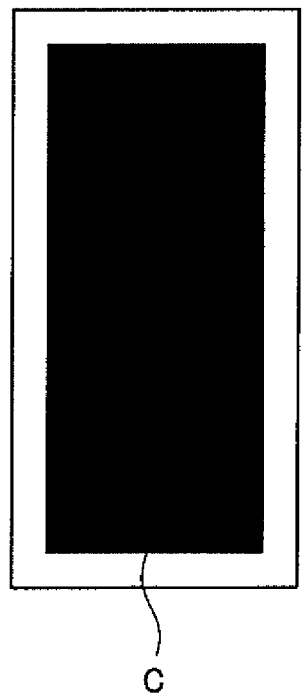
FIGS. 18A through 18C show conditions of the output buffer 32 produced by process for determining dot forming condition in case of non fine drawing in comparison with dot patterns in related art.

FIGS. 8A through 8C further show conditions of the output buffer 32 resulting from the process for determining the dot forming condition having this structure. FIG. 18A is an example of printing target image. The printing target image contains a drawing C. FIG. 18B shows dot data produced by related-art image process for the printing target image. The "related-art image process" herein refers to process for performing only half tone process. FIG. 18C shows condition of the output buffer 32 obtained by the process for determining dot forming condition according to this embodiment.

The printing pixels on the rightmost row and on the fifth line from the lowest line and the printing pixel on the rightmost row and on the lowest line are in the condition of forming no dot. Further, the printing pixels constituting edge portions are formed by dots varying in the size. On the other hand, as illustrated in FIG. 18C, S dots are formed for the printing pixels corresponding to black edge pixels, and M dots are formed for the printing pixels corresponding to black edge peripheral pixels during image printing by the printer 200. The dot forming condition for the printing pixels corresponding to normal process pixels having distance larger than 2 from the black edge is determined by the ordinary half tone process.

According to the printing system 1000 in this embodiment, therefore, the possibilities that dots of a mixture of different sizes are formed for printing pixels constituting edge parts, and that lack is produced on the printing pixels are eliminated. Therefore, unstableness and lack of edge parts are prevented during printing of images by the printer 200, and thus the printing image quality improves.

According to the process for determining the dot forming condition described above, the dot forming conditions of the printing pixels corresponding to the portions of the printing target image having the drawing width of value 4 or smaller such as the drawing A and the drawing B are determined as shown in FIGS. 6 and 13, for example. That is, dot pattern corresponding to the distance from the edge of the focused pixel in the narrow direction, i.e., the drawing width direction of the drawing is produced. Thus, dots of particular size can be allocated to the fine drawing part having a drawing width equal to or smaller than a predetermined value. Thus, the fine drawing part does not become excessively fine (thin) as a result of allocation of small size dots by the second dot allocating unit 21. Thus, the printing image quality further improves.

Particularly in this embodiment, dot size pattern is determined while giving priority to the direction of the drawing width of the drawing, that is, the narrow direction in the vertical and horizontal directions. Thus, the same dot size is continuously outputted in the longer direction. Accordingly, edges can be more smoothly printed.

According to this embodiment, dot forming condition is determined by half tone process for normal pixel corresponding to neither black fine drawing pixel nor black edge area pixel. Thus, limitation can be set to the total ink quantity per unit area of the printing medium for normal pixels. Accordingly, prevention of blur in color and improvement of printing image quality can be achieved.

According to the process for determining dot forming condition, sizes of dots allocated to the respective pixels are determined independent of the process results of surrounding pixels. Thus, parallel process can be easily performed by using dual core processor as CPU in this embodiment. Accordingly, the processing speed can be considerably increased.

D. Modified Example

The invention is not limited to the embodiment and examples described herein, but may be practiced otherwise without departing from the scope of the invention. For example, the following modifications may be made.

D1. Modified Example 1

According to this embodiment, the process for determining the dot forming condition capable of improving printing image quality at a black edge of only an image having white and black has been discussed. However, the invention is applicable to process for determining dot forming condition capable of improving printing image quality at an edge in color as one of dot colors used for image printing (such as cyan, magenta, and yellow) in an image having white and the corresponding dot color. Moreover, the invention can be employed for image data in each color during image processing of image data in respective colors for color images containing intermediate colors.

D2. Modified Example 2

According to this embodiment, the half tone processing unit 25 performs half tone process by using threshold process based on dither matrix. However, half tone process may be performed by concentration pattern method, error diffusion method (ED method) or other methods. Also, other peculiar process may be added to these known half tone processes to produce the half tone processing unit for determining dot forming condition.

D3. Modified Example 3

According to this embodiment, dot pattern for each drawing width produced by the first dot allocating unit 26 is determined such that the size increases as the distance from the edge increases. However, dot pattern may be produced by any methods as long as dot pattern is determined based on the drawing width. According to this embodiment, the allocation direction is determined in such a manner as to produce dot pattern corresponding to the distance from the edge of the focused pixel in the narrower direction in the vertical and horizontal directions of the drawing. However, dot pattern corresponding to the distance from the edge of the focused pixel in a direction other than the narrow direction may be produced.

D4. Modified Example 4

The dot size allocated by the second dot allocating unit 27 is not limited to the dot size shown in this embodiment, but may be other size such as S dot size allocated even when the distance from the edge is value 1 or value 2, for example. It is preferable that dots of size other than the maximum size (L dot) in the plural sizes used for printing are allocated for printing pixels corresponding to black edge area pixels In this case, blur and boldness at the edge portion can be more appropriately prevented, and the printing image quality can improve.

D5. Modified Example 5

While the CPU is constituted by dual core processor in this embodiment, multi core processor including another number of cores such as 3 and 4 cores may be used.

D6. Modified Example 6

According to this embodiment, in the edge area determining unit 23, whether the focused pixel is a black edge pixel or not is determined by judging whether at least one of four pixels adjacent to the focused pixel in the up, down, left, and right directions is white or not. However, this judgment may be made by judging whether at least one of eight pixels adjacent to the focused pixel in the up, down, left, right, upper-left, lower-left, upper-right, and lower-right directions is white. Judgment for black edge peripheral pixel may be also made by judging whether at least one of eight pixels where the distance from the edge is value 2 in the focused pixel in eight directions, that is, the up, down, left, right, upper-left, lower-left, upper-right, and lower-right directions instead of the focused pixel directions of the up, down, left, right is white.

D7. Modified Example 7

According to this embodiment, the process for determining dot forming condition by the same method for the entire printing target image 40. However, the process for determining dot forming condition may be performed by the method of this embodiment only for text districts containing characters and drawings (symbols, figures, graphs and the like) of the printing target image 40. In this case, the text districts may be detected based on RGB values of image data or based on luminance values of pixels.

D8. Modified Example 8

According to this embodiment, image data is constituted by RGB data. However, image data is not required to be RGB data. According to this embodiment, the printer 200 performs printing by forming dots of three sizes using ink in four colors of CMYK. However, the printer 200 may perform printing using ink in color other than CMYK or forming dots of two (or four or more) sizes.

D9. Modified Example 9

According to this embodiment, the image processing device is constituted by the personal computer 100. However, the invention is applicable to other image processing devices which perform image processing for determining dot forming condition as well as the personal computer 100. For example, the image processing device may be constituted by the printer 200.

A part of the structure provided by hardware in this embodiment may be provided by software. On the other hand, a part of the structure provided by software in this embodiment may be provided by hardware.

D10. Modified Example 10

According to this embodiment, the printer including a head which shifts in the main scanning direction to inject ink onto printing medium has been discussed. However, the invention is applicable to a line head printer including a plurality of heads disposed in the main scanning direction and not shifted for printing.

The entire disclosure of Japanese Patent Application No. 2008-128300, filed May 15, 2008 is expressly incorporated by reference herein.

What is claimed is:
1. An image printing system which determines dot forming condition when printing an image containing a plurality of pixels by using dots of a plurality of sizes, comprising a multi-core processor for operating:

a fine drawing detecting unit which detects a dot color fine drawing pixel having a dot color used for printing the image and positioned on a fine drawing portion having a drawing width equal to or smaller than a predetermined value;

an edge area detecting unit which detects a dot color edge area pixel having a dot color used for printing the image and positioned at a distance equal to or shorter than a predetermined value from an edge of the image;

a first dot allocating unit which allocates dots such that a dot of predetermined size in the dots of the plural sizes can be formed for the dot color fine drawing pixel during printing the image; and a second dot allocating unit which allocates dots such that a dot of a size determined according to the distance from the edge of the image in the dots of the plural sizes can be formed for the dot color edge area pixel not corresponding to the dot color fine drawing pixel during printing the image.

2. The image printing system according to claim 1, wherein the first dot allocating unit determines the predetermined size based on the drawing width and the distance from the edge in direction of the drawing width.

3. The image printing system according to claim 1, further comprising a half tone processing unit which determines dot forming condition for a pixel corresponding to neither the dot color fine drawing pixel nor the dot color edge area pixel in the plural pixels contained in the image by half tone process.

4. The image printing system according to claim 1, wherein the image is an image consisting of white and one color of dots used for printing the image.

5. The image printing system according to claim 1, further comprising a half tone processing unit which determines dot forming condition for a pixel corresponding to neither the dot color fine drawing pixel nor the dot color edge area pixel in the plural pixels contained in the image by half tone process;

wherein the first dot allocating unit determines the predetermined size based on the drawing width and the distance from the edge in direction of the drawing width; and wherein the image is an image consisting of white and one color of dots used for printing the image.

6. An image printing method which determines dot forming condition when printing an image containing a plurality of pixels by using dots of a plurality of sizes, comprising:

detecting a dot color fine drawing pixel having a dot color used for printing the image and positioned on a fine drawing portion having a drawing width equal to or smaller than a predetermined value from the plurality of pixels;

detecting a dot color edge area pixel having a dot color used for printing the image and positioned at a distance equal to or shorter than a predetermined value from an edge of the image from the plurality of the pixels;

allocating dots such that a dot of predetermined size in the dots of the plural sizes can be formed for the dot color fine drawing pixel during printing the image; and allocating dots such that a dot of a size determined according to the distance from the edge of the image in the dots of the plural sizes can be formed for the dot color edge area pixel not corresponding to the dot color fine drawing pixel during printing the image.

7. A non-transitory computer-readable medium having stored thereon a computer program for image printing which determines dot forming condition when printing an image containing a plurality of pixels by using dots of a plurality of sizes and commands a computer to perform functions of:

detecting a dot color fine drawing pixel having a dot color used for printing the image and positioned on a fine drawing portion having a drawing width equal to or smaller than a predetermined value from the plurality of the pixels;

detecting a dot color edge area pixel having a dot color used for printing the image and positioned at a distance equal to or shorter than a predetermined value from an edge of the image from the plurality of the pixels;

allocating dots such that a dot of predetermined size in the dots of the plural sizes can be formed for the dot color fine drawing pixel during printing the image; and allocating dots such that a dot of a size determined according to the distance from the edge of the image in the dots of the plural sizes can be formed for the dot color edge area pixel not corresponding to the dot color fine drawing pixel during printing the image.

* * * * *